United States Patent [19]

Ploumen

[11] 4,406,977
[45] Sep. 27, 1983

[54] POWER SUPPLY CIRCUIT

[75] Inventor: Hubert J. Ploumen, Borne, Netherlands

[73] Assignee: Hollandse Signaalapparaten B.V., Hengelo, Netherlands

[21] Appl. No.: 224,572

[22] PCT Filed: Mar. 21, 1980

[86] PCT No.: PCT/NL80/00007
§ 371 Date: Dec. 4, 1980
§ 102(e) Date: Nov. 26, 1980

[87] PCT Pub. No.: WO80/02217
PCT Pub. Date: Oct. 16, 1980

[30] Foreign Application Priority Data

Apr. 4, 1979 [NL] Netherlands .......................... 7902630

[51] Int. Cl.³ .............................................. H04N 9/27
[52] U.S. Cl. ..................... 315/375; 315/371; 358/73
[58] Field of Search ............. 315/371, 411 (U.S. only), 315/289 (U.S. only), 371, 375, 387, 389; 358/72, 73; 313/473; 340/704

[56] References Cited

U.S. PATENT DOCUMENTS

| Re. 28,631 | 11/1975 | Waehner et al. | 315/371 |
| 3,805,253 | 4/1974 | McLanaghan | 340/704 |
| 3,887,829 | 6/1975 | Owens, Jr. | 315/389 X |
| 3,887,840 | 6/1975 | Maytum | 315/389 |
| 4,088,928 | 5/1978 | Waehner | 315/411 X |
| 4,092,566 | 5/1978 | Chambers et al. | 315/375 |

FOREIGN PATENT DOCUMENTS 2105070 4/1972 France .

Primary Examiner—Theodore M. Blum
Assistant Examiner—Robert C. Burk
Attorney, Agent, or Firm—Thomas A. Briody; William J. Streeter; Edward W. Goodman

[57] ABSTRACT

A power supply circuit is provided with a voltage control circuit (1) with negative feedback for applying a rapidly changing high voltage to the anode of a penetron-type cathode ray tube (3) for a color display system and with a deflection voltage correcting unit (5) for obtaining color-independent pictures on the screen of the cathode ray tube. The deflection voltage correcting unit is controlled by at least a correction signal derived from an input voltage of the voltage control circuit.

4 Claims, 2 Drawing Figures

POWER SUPPLY CIRCUIT

BACKGROUND OF THE INVENTION

The invention relates to a power supply circuit, provided with a voltage control circuit with negative feedback for applying a rapidly changing high voltage to the anode of a penetron type cathode ray tube for a color display system, and with a deflection voltage correcting unit for obtaining color independent pictures on the screen of the cathode ray tube.

To increase the legibility of a display, a multicolor tube is employed. Owing to the short working distance, it is undesirable to use a shadow-mask tube for this purpose; a penetron tube gives considerably better results. The penetron tube has two different phosphor layers. With a certain anode voltage the electrons excite mainly the first phosphor layer, while with a certain higher anode voltage, the electrons are sufficiently accelerated to penetrate the barrier layer between the two phosphor layers and excite the second phosphor layer. The two anode voltages light up the screen in a certain color; with intermediate anode voltages mixed colors are obtainable. Four-color displays are in common use. In such color displays, the electron beam will hit the screen at a different place for each color with a specific deflection voltage; as the electrons continually acquire a different acceleration by the anode voltages corresponding with the various colors. The deflection voltages should therefore be corrected by a fixed factor for each color. To switch the anode voltage from a first to a second value, a certain time will elapse before the anode voltage settles to its second value and stabilizes. In this switching period, the beam electrons are subjected to a change in acceleration, causing positional errors to be displayed, even if fixed correction factors are applied to the deflection voltages for the individual colors, unless the display is blanked during the switching.

A power supply circuit as set forth in the opening paragraph is known from the German Offenlegungsschrift 26 19 520, in which the deflection voltages are permanently corrected by a fraction of the anode voltage. To improve the long-term stability of the circuit, it is preferable to avoid a direct coupling between the deflection channels and the anode voltage.

SUMMARY OF THE INVENTION

According to the invention a deflection voltage correcting unit is thereto controlled by at least a correction signal derived from an input voltage of the voltage control circuit. This correction signal is therefore directly related to the control voltage of the voltage control circuit with negative feed-back. With an input voltage typical of a certain color, the voltage control circuit can be set in such a way that the control voltage, and hence the correction signal, are adjusted to a value corresponding with this color. This however requires an exceptionally broad range of the control voltage. It is therefore preferable that the deflection voltage correcting unit comprises a coarse and a fine correcting circuit, wherein the coarse correcting circuit is controlled by a signal typical of a particular display color and the fine correcting circuit by the correction signal derived from an input voltage of the voltage control circuit. The control voltage and hence the correction signal for the fine correcting circuit can then be continually adjusted to zero. In the coarse correcting circuit the deflection voltages are corrected by a fixed factor required for each color, while in the fine correcting circuit errors due to imperfections in the switching of the anode voltage are compensated. If now the voltage control circuit is divided into a coarse and a fine control, and the correction signal for the fine correction circuit is derived from the control voltage of the fine control of the voltage control circuit, the errors which would arise through variations in the anode voltage could be compensated in the deflection voltage very accurately. In particular, the compensation of the errors, which would arise during the settling time while switching the anode voltage, give the voltage control circuit the effect of one with very short switching times.

DESCRIPTION OF THE DRAWINGS

The invention will now be described with reference to the accompanying figures, of which.

DESCRIPTION OF THE PREFERRED EMBODIMENT

Figure 1:
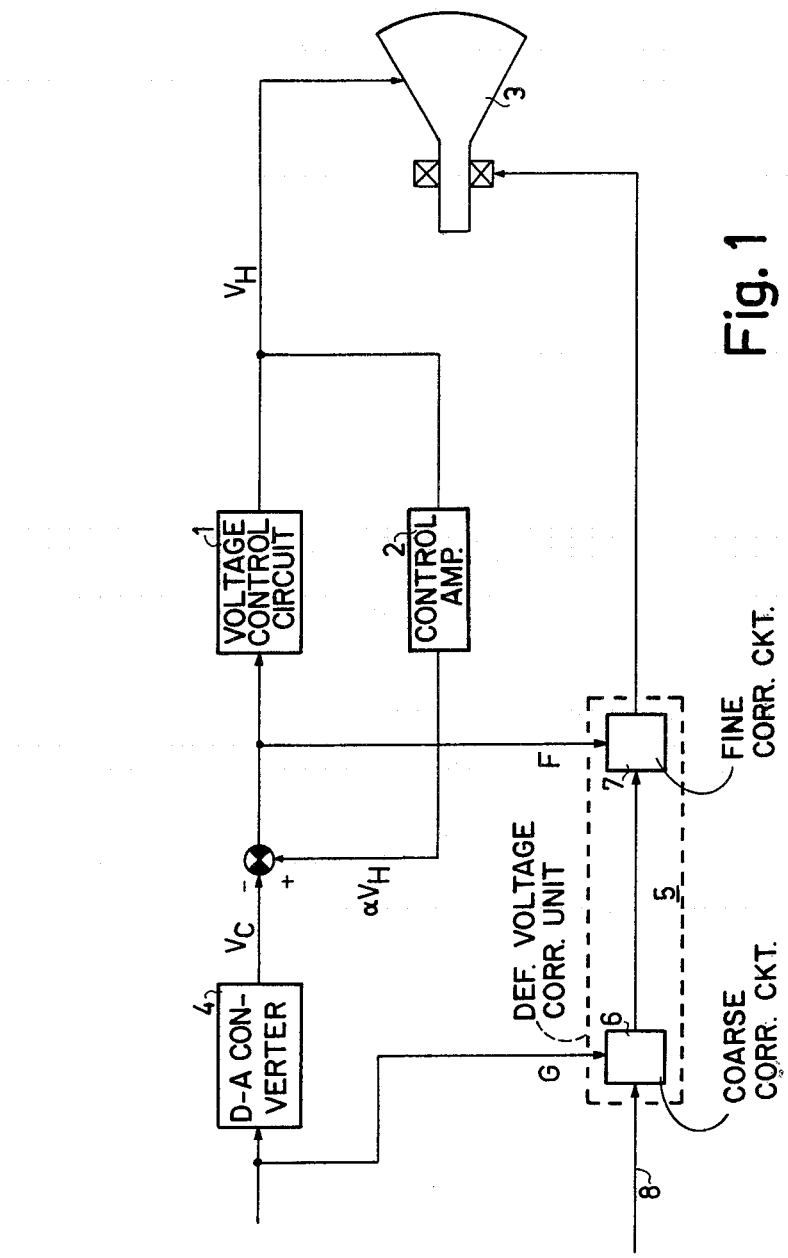
FIG. 1 is a circuit diagram of a power supply circuit according to the invention.

The power supply circuit of FIG. 1 comprises a voltage control circuit 1, of which the output voltage $V_H$ is fed back, via a control amplifier 2, to be combined with an input voltage $V_C$ for voltage control circuit 1. The power supply circuit produces the anode voltage for a penetron type cathode ray tube 3. The input voltage $V_C$ is supplied by a digital-analog converger 4. A computer (not shown) delivers a digital code for color to be displayed to converter 4 which converts this code in a corresponding voltage $V_C$. From voltage $V_C$ and a fraction $\alpha$ of the anode voltage $V_H$ fed back, a control $-V_C + \alpha V_H$ is produced for voltage control circuit 1.

The power supply circuit of FIG. 1 further comprises a deflection voltage correcting unit 5 to adapt the deflection voltages for cathode ray tube 3 for each of the colors to be displayed in such a way that the displayed pictures are independent of color. Correcting unit 5 is provided with a coarse correcting circuit 6, which is controlled by the computer-supplied digital color code, represented by signal G, and with a fine correcting circuit 7 connected to the coarse correcting circuit 6, which fine correcting circuit 7 is controlled by a signal F derived from the control voltage $-V_C + \alpha V_H$. Signal G, corresponding with a certain display color, is used to correct the deflection voltage, applied via line 8, by a fixed factor determined by the color to be displayed, while signal F is used to correct the deflection voltage in accordance with imperfections in the switching of the anode voltage. It should be noted that for the sake of simplicity, only one of the two orthogonally acting deflection voltages is considered.

Figure 2:
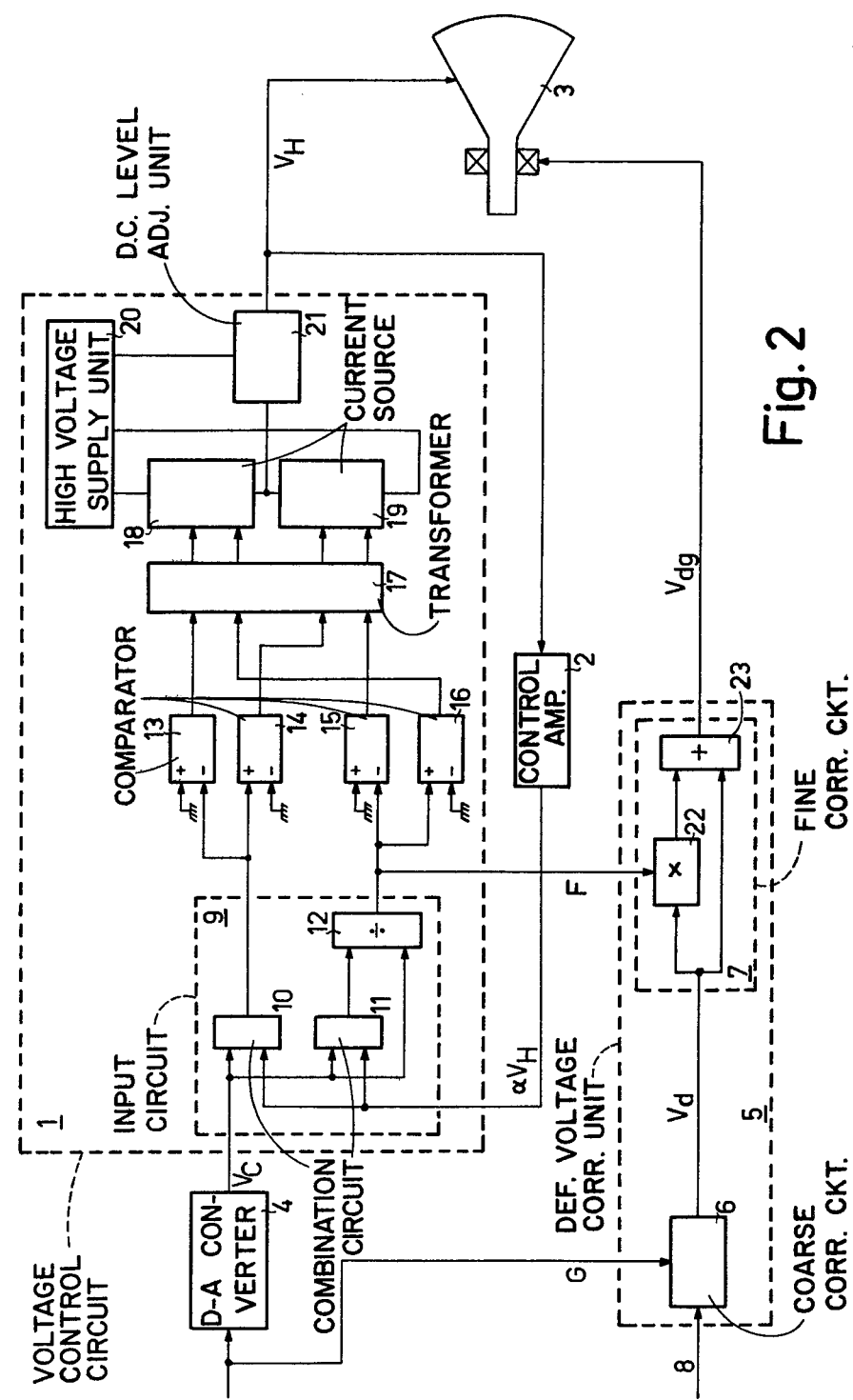
FIG. 2 is a block diagram of a preferred embodiment of such a circuit.

In a preferred embodiment of the power supply circuit, in FIG. 2 voltage control circuit 1 comprises a coarse and a fine control. Control circuit 1 incorporates an input circuit 9 for both the coarse and the fine controls. Input circuit 9 comprises two combination circuits 10 and 11, each arranged to receive the voltage $V_C$ and the output $\alpha V_H$ of the control amplifier 2, and a divider 12 arranged to divide the output of combination circuit 11 by the voltage $V_C$, and provides at the outputs thereof the voltages $$-a \cdot V_C\left(1 - k\frac{\alpha V_H}{V_C}\right) \text{ and } -b\left(1 - k\frac{\alpha V_H}{V_C}\right)$$

wherein a, b and k are constants. The voltage $$-a \cdot V_C\left(1 - k\frac{\alpha V_H}{V_C}\right)$$

from combination circuit 10 is the control voltage for the coarse control in the power supply circuit; this control voltage is representative of the absolute error in the anode voltage. If the anode voltage corresponds with the applied input voltage $V_C$ typical of a display color, $k(\alpha V_H/V_C)=1$. If, however, the display color is to be changed, a different value for $V_C$ is applied and the voltage $$-a \cdot V_C\left(1 - k\frac{\alpha V_H}{V_C}\right)$$

controls the anode voltage in such a way that this control voltage is returned to zero. The voltage $$-b\left(1 - k\frac{\alpha V_H}{V_C}\right)$$

supplied by divider 12 is the control voltage F for the fine control in the power supply circuit; this control voltage is representative of the relative error in the anode voltage if this voltage has already approximated the value corresponding with that of $V_C$ last applied. During the settling period after an anode voltage change initiated by a change of $V_C$, the relative error retains its maximum value, that is with the switching during the "slew" time the voltage $$-a \cdot V_C\left(1 - k\frac{\alpha V_H}{V_C}\right)$$

decreases from a maximum to zero, while the voltage $$-b\left(1 - k\frac{\alpha V_H}{V_C}\right)$$

retains its value; the latter voltage decreases from a maximum to zero during the settling time.

Voltage control circuit 1 further comprises four comparators 13-16, a transformer 17, two current sources 18 and 19, a high voltage supply unit 20 and a d.c.-level adjusting unit 21, which are used to obtain a coarse and a fine control in the voltage control circuit 1. Comparators 13-16 supply the control signal for the switching and adjusting currents of the current sources 18 and 19 connected thereto via transformer 17. With small deviations in the anode voltage, only one of the comparators 15 and 16 (the so-called settling comparators), depending on the sign of these deviations, is activated by the control voltage from divider 12 to switch on the adjusting current of the particular current source; with large deviations in the anode voltage the control voltage from combination circuit 10 is sufficient to activate one of the comparators 13 and 14 (the so-called slew comparators) to switch on the switching current of the particular current source. The d.c.-level adjusting unit 21 can be applied to reduce the switching level to about zero volts. The two current sources 18 and 19 and d.c.-level adjusting unit 21 are fed by the high voltage supply unit 20. If current source 18 is activated, there will be a current flow from the anode of tube 3 through adjusting unit 21 and current source 18; if current source 19 is activated, there will be a current flow through current source 19 and adjusting unit 21 to the anode of tube 3. These currents remain as long as the control voltages applied to the comparators 13-16 are not zero. Since the embodiment of voltage control circuit 1, apart from input circuit 9, is no part of the invention and many other embodiments are feasible, only a brief description of a suitable embodiment is given.

Signal F from divider 12 is of concern to the control of the fine correcting circuit 7 in deflection voltage correcting unit 5. Although the output signal of combination circuit 11 could also have been used as the control voltage for the fine control in voltage control circuit 1, signal F has been selected as control voltage for the fine control in control circuit 1, since the signal F is required for the fine correcting circuit 7.

The fine correcting circuit 7 comprises a multiplier 22 and a combination circuit 23. Representing the coarsely corrected deflection voltage from coarse correcting circuit 6 as $V_d$, the output voltage of the fine correcting circuit 7, that is, the fully corrected deflection voltage $V_{dg}$, can be represented by:

$$V_{dg} = AV_d(1 + \beta F),$$

where $$F = -b\left(1 - k\frac{\alpha V_H}{V_C}\right)$$

and A and $\beta$ are constants.

The dimensions of input circuit 9 with respect to fine correcting circuit 7 are such that $\beta b = \frac{1}{2}$, so that $$F = -\frac{1}{2\beta}\left(1 - k\frac{\alpha V_H}{V_C}\right) \text{ and}$$

$$V_{dg} = AV_d\left[1 - \frac{1}{2}\left(1 - k\frac{\alpha V_H}{V_C}\right)\right].$$

Moreover, by dimensioning input circuit 9 in such a way that, after stabilization of a high voltage $V_H$ required for a certain display color, with respect to the reference voltage $V_C$ corresponding with this color, $k(\alpha V_H/V_C)=1$, so that $1-k(\alpha V_H/V_C)\approx 0$, during the adjustment, $V_{dg}$ can be expressed by $V_{dg}=AV_d\sqrt{k\alpha(V_H/V_C)}$.

As already stated, a fixed factor is applied for the coarse correction of the deflection voltage by means of signal G, while the fine correction is effected through a multiplication factor obtained from the square root of the ratio between anode voltage $V_H$ and reference voltage $V_C$ determining the display color. When the anode voltage assumes the value it requires in accordance with the reference voltage, the multiplication factor is equal to 1 and signal F is equal to 0. Therefore, fine correction occurs only during switching and settling to the new anode voltage level.

I claim:

1. A power supply circuit, provided with a voltage control circuit with negative feedback for applying a rapidly changing high voltage $V_H$ to the anode of a penetron-type cathode ray tube for a color display system, and with a deflection voltage correcting unit for obtaining color-independent pictures on the screen of the cathode ray tube, which deflection voltage correcting unit is controlled by a signal G, typical of a certain display color, by means of which signal G the input voltage $V_C$ of the voltage control circuit with negative feedback is obtained, characterized in that the deflection voltage correcting unit comprises a coarse correcting circuit and connected thereto a fine correcting circuit, where the coarse correcting circuit is controlled by the signal G and the fine correction circuit by a correction signal F derived from the control value $V_C - \alpha V_H$ supplied to the voltage control circuit, where $\alpha < 1$.

2. Power supply circuit, as claimed in claim 1, characterized in that the voltage control circuit comprises a coarse and a fine control, and the correction signal F is provided at the input of said fine control.

3. Power supply circuit as claimed in claim 2, characterized in that the fine correcting circuit, in response to a coarsely corrected deflection voltage $V_d$ and to the correction signal F, produces a corrected deflection voltage $A V_d(1+\beta F)$, where A and $\beta$ are constants, and that the voltage control circuit comprises an input circuit that, in response to a reference voltage $V_C$ typical of a certain display color and to a fraction $\alpha$ of the high voltage $V_H$ fed back, produces the correction signal F, expressed by $$F = -\frac{1}{2\beta}\left(1 - k\frac{\alpha V_H}{V_C}\right)$$

where k is a constant, for application to the fine control in the voltage control circuit.

4. Power supply circuit, as claimed in claim 2, characterized in that the input circuit is so dimensioned that $$k(\alpha V_H/V_C=1,$$

where k is a constant,
when a high voltage $V_H$, required for a certain display color, is stabilized with respect to the reference voltage $V_C$ corresponding with said display color.

* * * * *